Jan. 15, 1929.
C. O. NOACK
1,699,116
POWER CONTROLLING MECHANISM
Filed June 10, 1925   4 Sheets-Sheet 1
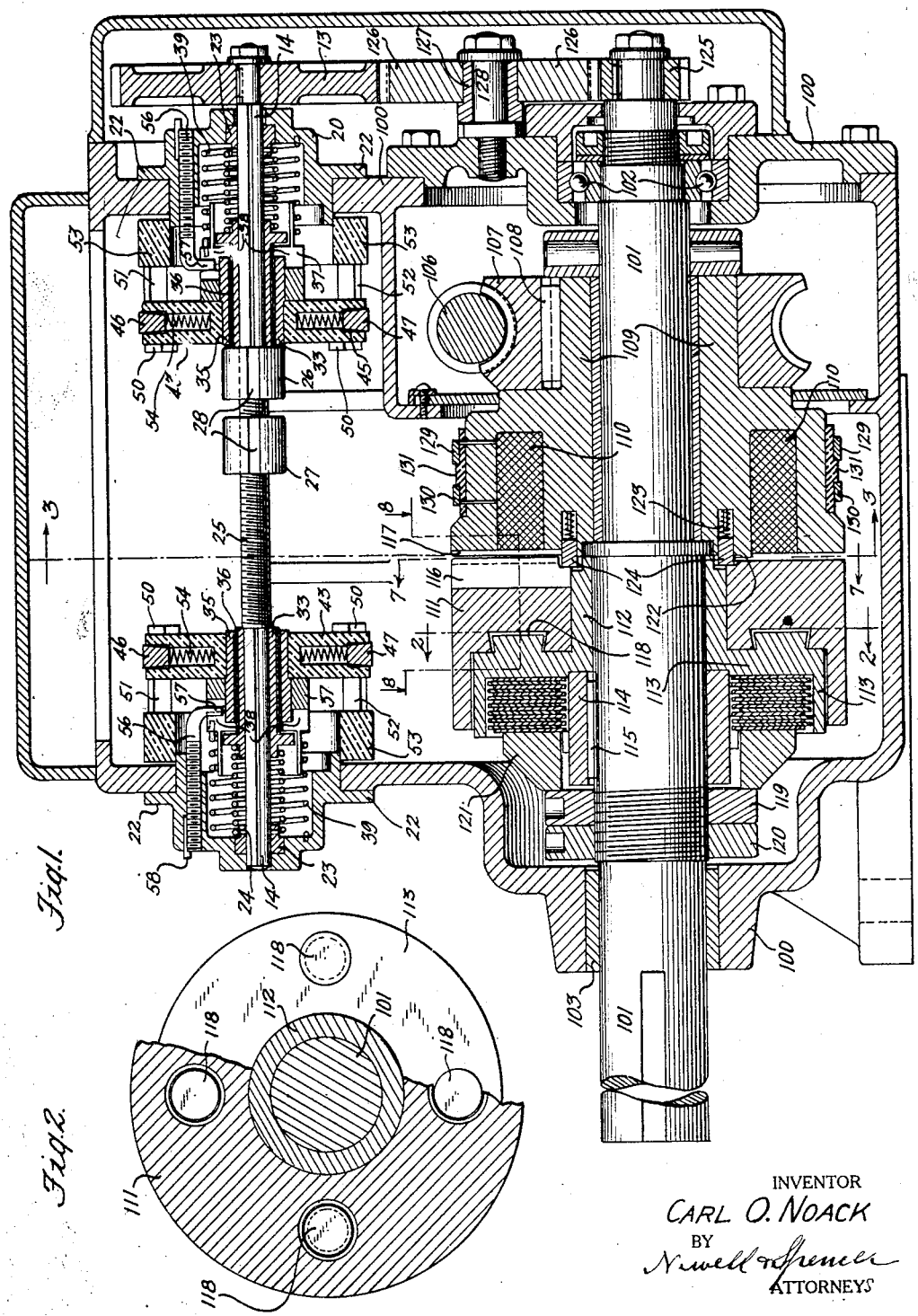
INVENTOR
CARL O. NOACK
BY
Newell & Spencer
ATTORNEYS

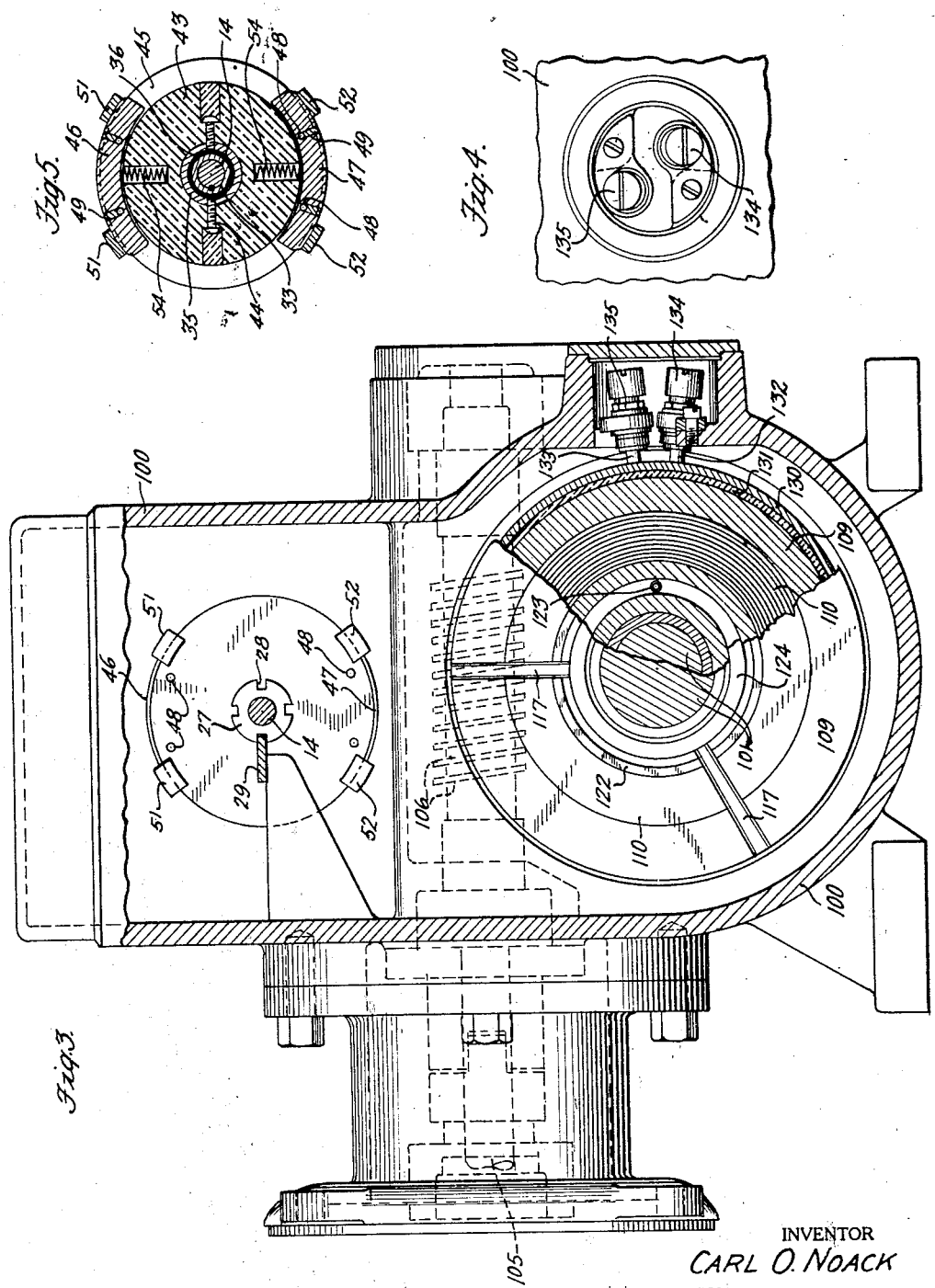

Jan. 15, 1929.  1,699,116
C. O. NOACK
POWER CONTROLLING MECHANISM
Filed June 10, 1925   4 Sheets-Sheet 3
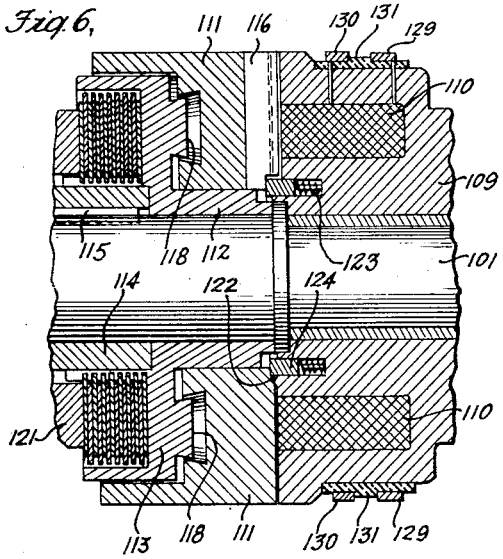
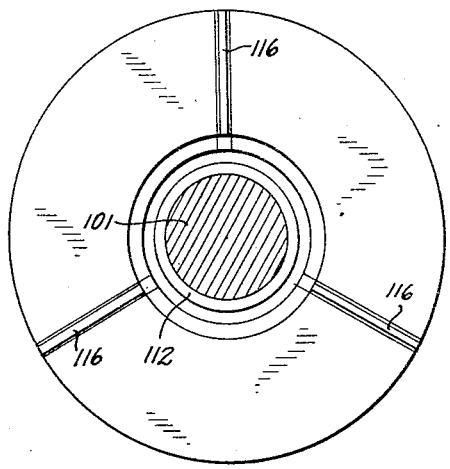
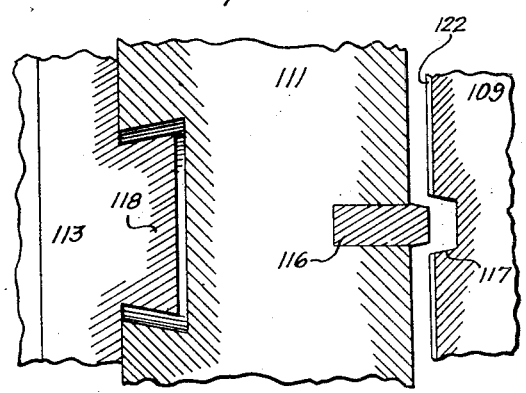
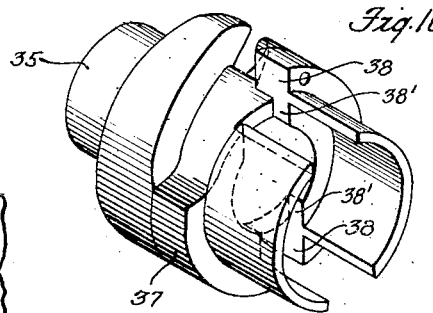
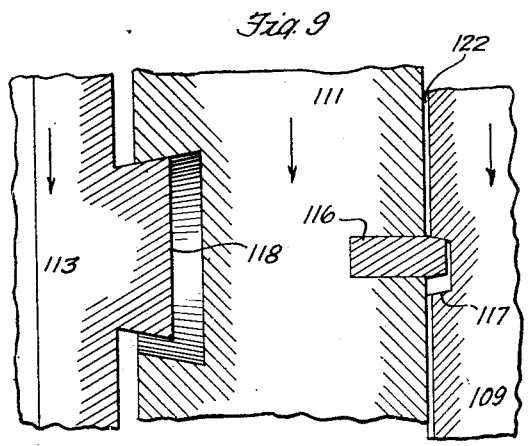
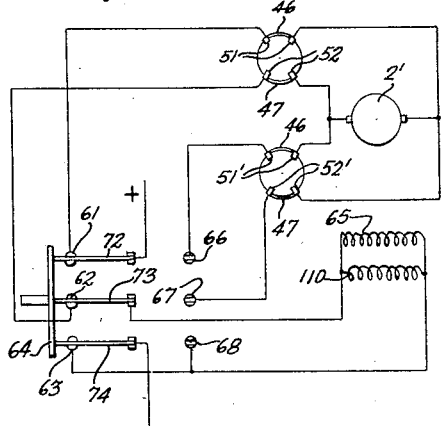
INVENTOR
CARL O. NOACK
BY
Newell & Spencer
ATTORNEYS Jan. 15, 1929.　　　　　　　　　　1,699,116
C. O. NOACK
POWER CONTROLLING MECHANISM
Filed June 10, 1925　　　4 Sheets-Sheet 4
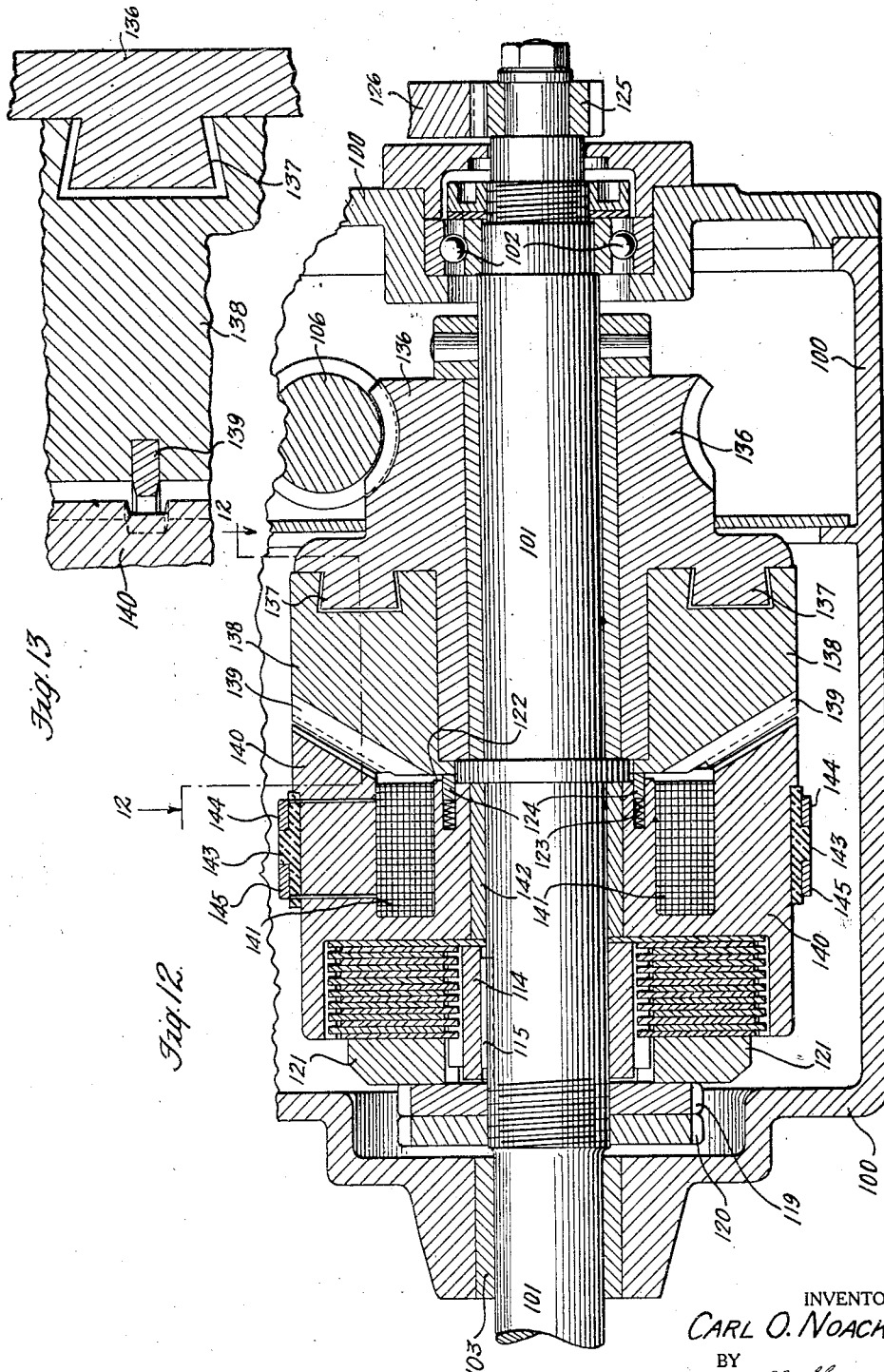
INVENTOR
CARL O. NOACK
BY
Newell Spencer
ATTORNEYS Patented Jan. 15, 1929.

1,699,116

UNITED STATES PATENT OFFICE.

CARL O. NOACK, OF STAMFORD, CONNECTICUT.

POWER-CONTROLLING MECHANISM.

Application filed June 10, 1925. Serial No. 36,137.

This invention relates to mechanism for controlling the application of power to a part or parts to be moved, and is more particularly concerned with the construction and arrangement whereby power may be applied to a part until such part has moved through a predetermined distance.

An object of my invention is to make such power controlled mechanism more reliable in action and to more effectively control the stoppage of the driving action on the driven part at the precise moment when the work which the driving element is to do on it, has been accomplished.

In the operation of comparatively large and heavy parts, such as valves, gates or the like, it is of course important that they be moved a definite distance. Especially is this the case on the closing movement, otherwise injury may be done to the parts, and since it is becoming more and more common to use power means, such as an electric motor, proper control of such motor becomes a problem for serious consideration.

When an electric motor, for instance, is run at say 1800 revolutions per minute to supply the necessary torque to do the work, then when the part to be moved or driven has reached the desired position, the driving action of the motor should instantly cease. Due to the momentum of the armature and parts connected thereto, the mere shutting off of the current when the driving part has been fully moved, is not sufficient. In case of a valve, for instance, there is danger of jamming the valve or causing injury to the valve seat, or twisting the valve stem if the motor remains connected to the part moved after the current is shut off, due to such momentum. Therefore, the provision of a limit switch, as has been proposed, for automatically controlling the motor circuit, is not an adequate solution.

In carrying out my present invention, I use a motor for furnishing the power, and I also employ a limit switch to control the motor circuit at the proper times and in addition provide means to render the motor ineffective to drive the driven part concomitantly with the breaking of the motor circuit.

A specific embodiment of my invention is shown in the drawings accompanying this specification, and while the means shown to accomplish the various objects of the invention is the best I have so far devised for attaining these ends, I do not desire to be limited to the construction illustrated and hereinafter specifically described, as it is obvious that variations may be resorted to within the spirit and scope of the invention, and some of the specific constructions may be used without others, and various modifications may be made without departing from the principle of the invention.

Referring to the drawings:

Fig. 1 is a longitudinal section of my power control mechanism showing the important parts;

Fig. 2 is a section on the line 2—2 of Fig. 1, looking in the direction of the arrows;

Fig. 3 is a section on the line 3—3 of Fig. 1, looking in the direction of the arrows;

Fig. 4 is a detail plan of the binding posts shown at the right in Fig. 3;

Fig. 5 is a detail section of part 43 taken on the line 5—5 of Fig. 1;

Fig. 6 is a section similar to Fig. 1, but showing the parts in clutched position;

Fig. 7 is a section on line 7—7 of Fig. 1;

Fig. 8 is a section on line 8—8 of Fig. 1;

Fig. 9 is a view similar to Fig. 8, but showing the clutch closed and the position these parts assume after the motor has started;

Fig. 10 is a detail perspective of the sleeve 35;

Fig. 11 is a schematic wiring diagram;

Fig. 12 is a view somewhat like Fig. 1, but in which the magnetic clutch has been somewhat modified; and Fig. 13 is a section on line 13—13 of Fig. 12.

Referring to the drawings, there is provided a suitable suporting framework or casing, the parts of which are shown in Fig. 1 and indicated by the reference character 100.

The main controlled member or shaft 101 is suitably supported in a casing, and has at one end a ball bearing 102 and a bearing sleeve 103 at the end remote from the ball bearing and where the shaft passes through the casing. This shaft may be directly connected to or geared with the part to be moved, such as a gate, valve stem or other driven part, but for convenience of description the shaft itself may be considered as a driven member.

The power used is preferably furnished by an electric motor shown conventionally at 2', Fig. 11, whose shaft 105, Fig. 3, is connected with a worm 106, Figs. 1 and 3. This worm engages with a worm gear 107 keyed at 108 to a member 109, which itself rotates loosely on the shaft 101. The motor therefore does not directly drive the shaft 101, but such drive is effected through connections which include a positively acting magnetic clutch.

In the construction shown in Fig. 1, the member 109 carries coil 110 properly wound so as to constitute one member of this clutch. The armature 111 constituting the other member of the clutch might be keyed to the shaft 101, but for certain reasons of safety to be hereinafter more specifically referred to, it is preferred to have the armature member turn loosely on the shaft, and in the particular construction shown such armature is supported by a sleeve portion 112 of a member 113, which latter is connected through a slip clutch to a member 114, the latter being keyed to the shaft by a key 115. The armature 111 has a longitudinal sliding movement on the sleeve 112 of sufficient extent to enable dogs 116 having beveled faces, to be engaged with and disengaged from corresponding depressions 117 in the other clutch element 109. As shown in Fig. 7, three of these dogs are provided, but of course a different number might be used. Connection between the armature element 111 and the member 113 is maintained by four pins 118 which are shown as of dovetailed form to engage corresponding recesses in the member 111, thereby permitting the member 111 to slide on the sleeve 112 but at the same time to be continuously in driving relation to the part 113, and hence drive the shaft. The armature member 111 is preferably made of soft iron so as not to hold the magnetism, although the dogs are preferably made of steel, because the driving action of the motor is transmitted through them.

Between the member 113 and the shaft there is preferably provided the friction clutch already referred to, which may be of the standard multiple automobile type. This clutch is provided in order to take care of any undue strains which would otherwise come upon the parts in case there is any blocking of the shaft or the part connected to it. In practice this clutch may be set to slip just above the maximum load which the shaft is designed to transmit to the valve or valve stem, and consequently if for any reason there is a blocking of the shaft or valve, the clutch will slip before the valve is strained or its stem sprung. This slip clutch includes the usual disks of alternate brass and steel, the steel disks being keyed to the part 114 which is itself keyed to the shaft 101. The shaft has a threaded portion which is engaged by locking nuts 119 and 120 for adjusting the slip clutch, these nuts engaging a member 121 which bears against the friction disks.

To prevent sticking of the armature to the other clutch element when the clutch coils have been deenergized, the member 109 has a ring 122 which projects slightly above the face of the clutch element 110, thereby leaving a small air gap between the armature and the face of this element at the time the clutch is closed.

To cause the armature to move away and disengage the dogs 116 from their depressions, I provide a number of coiled springs 123 which are seated in depressions in the member 109 and which bear against a ring 124 which engages the armature 111. This disengaging movement is also aided by the beveled faces of the dogs 116 and by the beveled pins 118. The angle, however, of the bevel on the dogs and on the pins is such that the camming action of these faces tending to disengage the clutch is negligible when the clutch coils are magnetized. When, however, the clutch coils lose their magnetism, as will be later described, the camming action due to the bevels referred to, together with the springs 122, cause the clutch to open.

With the mechanism thus far described, it will be understood that if the motor is started and if at the same time the coils 110 are energized, the armature 111 will be moved longitudinally of the shaft as permitted by the pins 118. If the beveled dogs do not happen to be in such positions that they immediately engage the recess 117, the motor may make several revolutions and attain some speed before the dogs actually engage, which, of course, gives added starting torque in picking up a load when the clutch dogs engage with their corresponding recesses. When this occurs, the shaft 101 is positively driven and the desired work which this shaft is called upon to do is performed. When a predetermined number of rotations have been made, corresponding to the completion of the work which the shaft 101 is called upon to do, it is desirable that the motor circuit and the circuit through the coils of the magnet be broken at the same instant. This will result in the magnetic clutch being deenergized and although the motor may run on, due to momentum, there is no driving action communicated to the shaft 101.

This control of the circuit through the motor and the magnetic clutch is affected by a limit switch which may be of any suitable construction, but for the purposes of this disclosure I have shown a limit switch or controller for motors substantially identical with that shown and described in the patent to Stuart, No. 1,154,274, September 21, 1915, and reference is made to said patent for a more detailed description of this controller than it is thought necessary to give here.

In order, however, that the cooperation of the controller and the motor and the clutch may be fully understood, it may be stated that there is keyed on the right-hand end of the shaft 101, as viewed in Fig. 1, a pinion 125 which engages with a gear 126 mounted to turn loosely upon a bushing 127 supported by a stud 128 screw-threaded into the casing or framework 100. This gear acts as an idler to transmit motion from the shaft 101 to the initial element of the limit controller.

To facilitate ready comparison of the Stuart patent and to readily identify parts shown and described in said patent with corresponding parts described in this specification, I shall use in this description the same reference characters employed in the Stuart patent.

Referring to Figs. 1 and 2 of said patent, it will be noted that the large gear of the controller is designated 13. In the present application, Fig. 1, 13 designates the initial driving element of the controller and is in meshing relation with the idler 126. The gear 13 is keyed to the shaft 14 of the controller, which shaft is provided with screw-threads 25 along its central portion.

20 and 21 are caps which are seated in alined holes in the controller casing, and provided with flanges 22 resting against the outer faces of the ends of the casing. The inner faces of the caps are recessed to receive bearing collars 23 secured to the shaft 14 by cross pins 24. This shaft extends through openings in the ends of the caps and supported by the collars 23.

26 and 27 are two nuts which cooperate with the threads 25. These nuts have in their peripheries the slots 28 parallel with the screw to receive the edge of the bar 29, Fig. 3, secured on the inner face of the casing.

Between the nut 26 and the cap 20 is splined a sleeve 33. 35 is a sleeve both slidable and rotatable on the sleeve 33, there being preferably one or more brass sleeves 36 between the sleeves 33 and 35. The outer portion of the sleeve 35, just inwardly from the lugs 34, is provided with the outwardly extending flange 37 provided with the radial slots 38. These parts are shown in detail in the patent, and are therefore merely generally referred to here. 39 is a coiled expansion spring seated between the cap 20 and the outer face of the flange 37. The spring 39 is partially coiled under tension so as to tend to rotate the sleeve 35 toward the observer to break the electric circuit at the proper time.

To the inner end of the sleeve 35 the disk 43, Figs. 1, 3 and 5, composed of insulating material is secured by the screws 44 and provided with the annular groove 45. At diametrically opposite positions in the groove 45, I place the brushes 46 and 47 composed of electric conducting material, such as carbon, the brushes being held in place with their outer edges beyond the disk 43 by means of the cross-pins 48 extending through the slots 49 in the brushes and into the adjacent walls of the groove 45. The inner travel of the disk 43 and sleeve 35 is limited by the engagement of the inner face of the disk near its edge with the hooks or lugs 50 which are bent down on the inner ends of the contacts 51 and 52 composed of good conducting material, such as copper, and have the outer ends secured to the insulating block or disk 53 lying between the disk 43 and the adjacent end of the casing 100. The contacts 46 and 47 are forced outwardly against the pins 48 or the contacts 51 and 52 by the coiled expansion springs 54 in sockets in the disk 43.

56 is a screw extending through the cap 20 and having its inner end bent toward the shaft 14 into the hook 57 which may stand in one of the slots 38 to prevent the rotation of the sleeve 35, as shown in Fig. 2, or stand against the outer face of the flange 37 to prevent the movement of the sleeve 35 inwardly under the action of the spring 39. The screw 56 is held from rotation by the key 58, which is removable to permit the rotation of the screw and the adjustment of the hook 57.

The parts at the left-hand end of the figure are the same as at the other end but they are arranged in the reverse order.

Reference may now be had to the schematic wiring diagram shown in Fig. 11 for an understanding of the electrical connections from the limit controller to the motor and to the magnetic clutch. In his figure I show the armature terminals connected respectively to one contact 51 and one contact 52, and also respectively to one contact 51' and one contact 52', see also Fig. 3. The three switch contacts 61, 62 and 63, on one side of the double throw switch 64, are connected respectively to the remaining contact 51 and the remaining contact 52, and to one terminal of the series motor field 65 which is connected in parallel with the magnetic coils 110 of the magnetic clutch, while the other three switch contacts 66, 67 and 68 on the other side of the switch 64 are connected respectively to the remaining contacts 52' and 51', also to the field terminal 65 and the coils 110 of the magnetic clutch. The remaining field terminal is connected to the positive line, which is also connected to blade 62 of the switch. The negative line is connected to the switch blade 73.

For the purpose of connecting the proper wires with the magnetic clutch coils 110, there is provided two bands 129 and 130 on the periphery of the member 109, these bands being of electrically conducting material separated by a band 131 of insulating material, as shown in Fig. 1. In Fig. 3 one of these contacting bands is shown and also brushes 132 and 133, one for each band, connected respectively with binding posts 134 and 135, and spring pressed to bear upon their respective bands 129 and 130. The circuit leading through the motor field is connected in parallel with the circuit leading to the binding posts 134 and 135, so that when current is broken through the motor field, it is also broken through the magnetic clutch.

The operation of the device may be briefly stated as follows: The electric circuits are as shown on Fig. 11, and the controller parts are as shown on Fig. 1. The parts are in the position assumed just before the motor is to be stopped, it being assumed that the motor is rotating the shaft 14 so as to cause the nuts 26 and 27 to travel to the right. The motor 2' has caused the nut 26 to merely contact with the end of the sleeve 33. As the mechanism at the left on Fig. 1 will now remain idle, the description will now relate to the mechanism at the right-hand end of Fig. 1. As the motor 2' rotates, it rotates both the shaft 14 and the shaft 101, the latter causing the operation of the apparatus which must be stopped at a definite place or position. The nut 26 is adjusted on the shaft 14 so that it will cause the motor circuit to be broken when the shaft 101 has rotated the exact number of times to bring the said apparatus to the desired position or condition. As the nut 26 travels to the right from the position shown, it begins to push the sleeve 33 outwardly, and when this sleeve has been pushed to the right a short distance, the nut 26 engages the end of the sleeve 35. Then the nut 26 pushes both sleeves 33 and 35 outwardly until the flange 37 is moved beyond the hook or stop 57, whereupon the spring 39 rotates the sleeve 35 toward the observer, the inner face of the flange 37 sliding behind the hook 57, which will prevent the inward movement of the sleeve 35 until the flange 37 has been rotated back so that the slot 38 comes again in line with the hook 57.

During the time the motor has been running, the current through the armature (Fig. 11) has been passing from the positive line through the switch blade 72, the switch contact 61, the contacts 51 and the brush 46, the armature 2', the contacts 52 and the brush 47, the switch contact 62, the switch blade 73, and the series field 65 and clutch coils 110 to the negative line. When the spring 39 rotates the sleeve 35 toward the observer, as was just described, the brush 46 was moved (see Figs. 1 and 11) to interrupt the current between the contacts 51, and the brush 47 was moved to interrupt the current between the contacts 52.

The interruption of the circuit between the contacts 51 and the contacts 52 has resulted in cutting off the current supplied to the motor and to the clutch coils 110. The action of the springs 123, together with the bevels on the dogs 116 and the bevels on the pins 113, has caused the magnetic clutch to open and all driving action between the motor and the shaft 101 immediately ceases, although the latter may continue to run on for several revolutions due to momentum, but no damage can be done to the shaft 101 by the parts moved thereby, due to this momentum.

When it is desired to move the shaft 101 in the opposite direction a definite number of times, the operator throws the switch 64 so that the blades 72, 73 and 74 engage the respective contacts 66, 67 and 68, whereupon the motor will rotate in reverse direction and move the shaft 101 in the opposite direction to which it was previously moved, and when a predetermined number of rotations of the shaft have been made, the motor will again be deenergized at the same time that current ceases to flow through the coils of the clutch. The detailed operation of the limit controller for reverse operation is described on page 4 of the Stuart patent and will not be repeated here, it being sufficient to say that upon the reverse movement, the mechanism is left in such condition that it may be again reversed and these operations repeated indefinitely.

It may be appropriate to refer briefly to the setting of the limit switch or controller. The part to be moved, as for instance a valve, is first fully set by hand; the nut of the limit switch is turned down by hand until the moment the drum snaps off, thereby breaking the circuits through the motor and the magnetic clutch. The part to be moved a predetermined distance is then by hand set to its other extreme position, and the opposite nut of the limit controller is turned down to the other end of the limit switch until this contact drum has broken contact.

It should be noted that movement of the shaft 101 by hand is readily accomplished, because the magnetic clutch is disconnected at this time and therefore movement of the shaft is not transmitted to the motor. It will likewise be noted that by reason of the geared connection between the shaft 101 and the shaft 14, these two shafts always move in timed relation to each other.

In Fig. 12 I have shown a somewhat modified construction of the clutch parts, the principle of operation, however, being substantially the same. In this modified form the worm 106 leading from the motor shaft, drives the worm gear 136, turning loosely on the shaft 101. This member carries beveled pins 137 which are similar to the pins 118 carried by the member 113. The pins 137 likewise engage recesses in the armature 138, which armature is provided with beveled-faced dogs 139 set into the face of the armature 138, which faces make an acute angle with the shaft 101 instead of being at right angles thereto, as is the case with the construction shown in Fig. 1. The other member 140 of the magnetic clutch carries the coils 141 and is loosely mounted on the shaft 101 through the medium of a bearing sleeve 142. This member of the magnetic clutch is recessed at its left end, as viewed in Fig. 12. This recess receives rings of a slip clutch, each alternate ring being loosely mounted on a bushing 141 keyed to the shaft 101, while the other disks or rings are fast to said bushing. The clutch member 140 is provided with an insulating band 143 and also with contacting bands 144 and 145 for supplying electric current to the clutch coils 141.

What I claim as new is:

1. The combination with a part to be driven and an electric motor for driving said part, of a normally deenergized rotatable magnetic clutch for connecting said motor to the driven part, said clutch including a radially recessed part and a part having radial dogs to engage said recesses, there being sufficient space between dogs to permit of lost motion as said clutch starts to rotate whereby the motor may gather momentum before the dogs seat in the recesses, means for energizing said motor and said magnetic clutch, and means for breaking the motor circuit and the magnetic clutch circuit when the driven part has reached a definite limit.

2. In combination, a part to be driven to a definite limit, a motor, a breakable connection and a slip clutch between the motor and driven part, said connection and slip clutch transmitting power from the motor to said part to drive said part to its limit, and a limit switch for breaking the motor circuit and said connection when the driven part has reached its limit.

3. In combination, a part to be driven between definite limits, a reversible motor for driving said part to its limits, a breakable connection and a reversible slip clutch between the motor and driven part for transmitting power of the motor in either direction to drive said part to its limits, and a limit switch for controlling the motor circuit and said breakable connection at the definite limits.

4. The combination with a shaft to be driven and a motor for driving it, of a worm driven from the motor, a worm gear loose on said shaft and engaging said worm, a two-part magnetic clutch having one of its parts mounted for rotation on said shaft and having sliding engagement with said worm gear, the other of its parts carrying coils for energizing the clutch and having a housing for the reception of the disks of a slip clutch, and a bushing keyed to said shaft and carrying cooperating disks of said slip clutch.

5. In combination, an electric motor, a shaft to be driven therefrom to a definite limit, a slip clutch, a magnetic clutch having one member thereof loose on said shaft and its other member in driving relation therewith through the medium of said slip clutch, and a limit switch for controlling the circuit to the motor and to the magnetic clutch when the motor has driven the shaft to its limit.

Signed at New York, N. Y., this 9th day of June, 1925.

CARL O. NOACK.